United States Patent [19]

Champeaux et al.

[11] Patent Number: 4,904,138
[45] Date of Patent: Feb. 27, 1990

[54] METHOD AND A DEVICE FOR THE OPERATION OF A MACHINE FOR BINDING SETS OF PAGES BY GLUING

[75] Inventors: René Champeaux; Jean-Pierre Merlo, both of Bourgoin Jallieu, France

[73] Assignee: C.P. Bourg Industries S.A., La Tour du Pin, France

[21] Appl. No.: 333,944

[22] Filed: Apr. 6, 1989

[30] Foreign Application Priority Data

Apr. 14, 1988 [FR] France ................................ 88 05186

[51] Int. Cl.⁴ .............................................. B42C 9/00
[52] U.S. Cl. .......................................... 412/8; 412/11; 412/13; 412/14
[58] Field of Search ......................... 412/8, 11, 13, 14

[56] References Cited

U.S. PATENT DOCUMENTS

| | | | |
|---|---|---|---|
| 4,484,850 | 11/1984 | Shimizu | 412/11 |
| 4,678,386 | 7/1987 | Wilholm | 412/8 |
| 4,767,250 | 8/1988 | Garlicks | 412/11 |

*Primary Examiner*—Frank T. Yost
*Assistant Examiner*—Eugenia A. Jones
*Attorney, Agent, or Firm*—Sixbey, Friedman, Leedom and Ferguson

[57] ABSTRACT

A machine for the adhesive binding of sets of pages comprises a control device with:
  a sensor to sense the thickness of the set of pages placed on the carriage and held gripped between the jaws thereof, said sensor being arranged to provide a signal representative of the thickness of the set of pages which is so gripped, and
  a regulating unit for modifying the speed of the motor means in response to an output signal from the sensor.

15 Claims, 3 Drawing Sheets

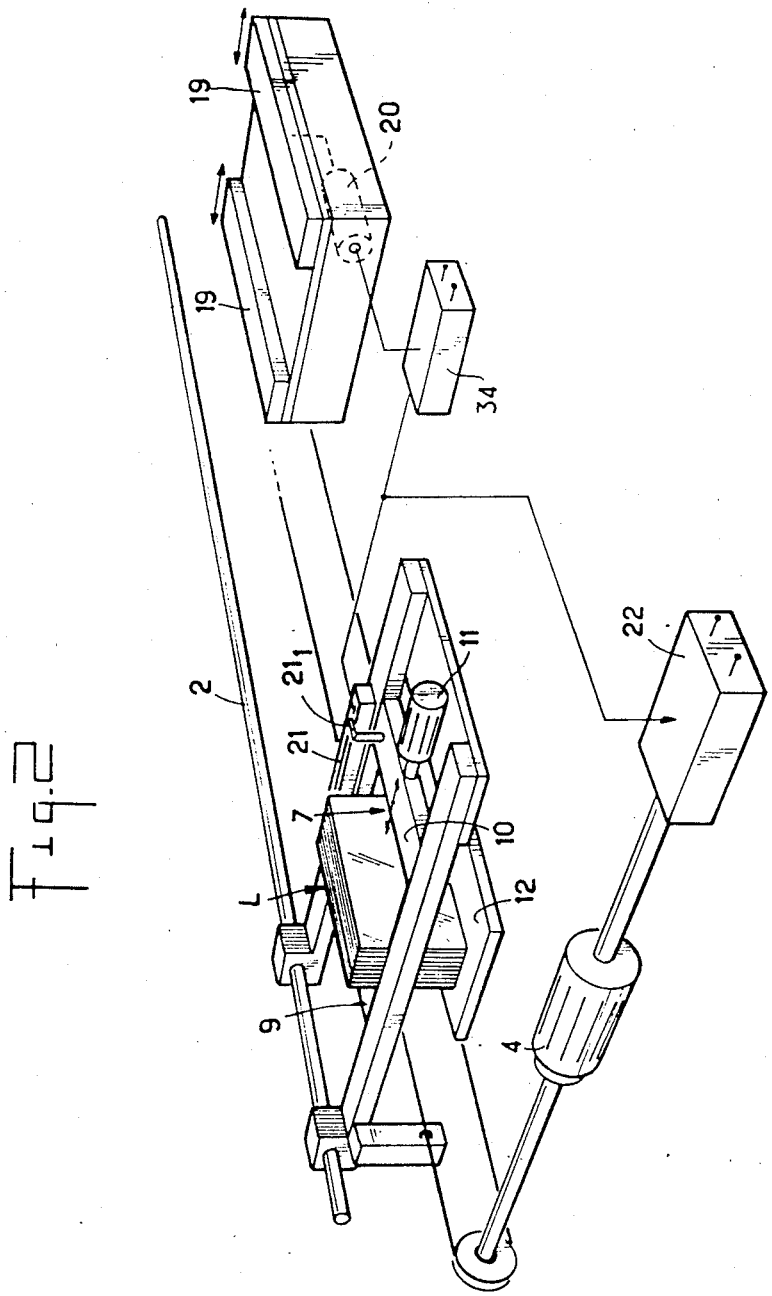

METHOD AND A DEVICE FOR THE OPERATION OF A MACHINE FOR BINDING SETS OF PAGES BY GLUING

BACKGROUND OF THE INVENTION

The invention relates to a machine for adhesively binding pages, sheets, sets of pages or sections in order to present them in a unitary assembled form while at the same time facilitating arrangement and consultation of the pages.

More specifically, the invention is concerned with means for the control and operation of such machines.

As used in the trade such binding machines operating with the application of adhesive are so arranged that a motor means causes reciprocation of a holder in the form of a gripper carriage past different operating stations.

Generally a machine designed in this manner comprises a first, loading station at which a group of pages or sections is manually inserted between the jaws of the gripper on the carriage.

After the loading station there is a routing station which comprises a rotating member in order to cut into the spine of the stack of pages as the latter is moved along by the carriage. Such a station is also designed to cut glue grooves in the back face.

The routing station is followed by a gluing station at which the back face is coated with a layer of adhesive product which is generally applied in a liquid state after being melted.

After this gluing station the carriage moves the stack of gripped pages into alignment with an encasing station in order to align the stack of sheets with a cover which is pressed into contact with the routed and glued back face in order to ensure the fixation thereof. The encasing station is, generally, placed in alignment with a discharge conveyor. Such an encasing station comprises a table, which is able to be moved out of the way, and jaws, in the form of blades, adapted to press the cover on the two surfaces of the sheets in the parts thereof adjacent to the back.

In machines of this type the maximum production rate, that is to say the number of bound products able to be turned out per hour, directly depends on the selection of the motor means used for a maximum thickness of sheets or sections to be united. This power of the motor is selected in order to take into account the conditions of operation of the routing and groove cutting station which is the station where the greatest amount of motor power is required.

It will be clear that in order to obtain a higher rate of production it is possible to design the machine with a more powerful motor. However such a modification inevitably leads to a higher purchase price of the machine, an increase in the overall size of the machine and an increase in the electrical power needed by the user of the machine.

A further point to be noted is that the conditions of use of such machines make it clear that it is not often that they are regularly used for the binding of printed products which have an identical thickness close to the maximum thickness. In fact it is more often the case that the user will have to employ his machine for binding sets of pages having different thicknesses and more especially with thicknesses lower than the value representing the maximum thickness with which the machine is capable of coping.

Thus in all those cases in which the machine is used on sets of pages with a thickness less than the maximum possible thickness the hourly production rate is not at a maximum, since the power of the motor means is not fully adapted to suit the work to be performed to bind such sets of pages.

SHORT SUMMARY OF THE INVENTION.

One object of the present invention is to provide a remedy to these shortcomings of the prior art and to provide a device and a method for operating an adhesive binding machine making it possible to adapt the power of the motor means to the work to be performed at the level of the operating stations in such a manner as to maximize the output rate for each possible thickness of the set of pages fed into the machine.

A further object of the invention is to devise a device for the control of an adhesive binding machine designed to provide, in accordance with the thickness of the set of pages to be bound, an automatic regulation of the power of the motor means without necessitating intervention or manual regulation.

Furthermore the invention seeks to provide a control or operating device ensuring the timing of the gripping by the encasing station of the set of pages in such a manner as to obtain an appropriate hardening of the adhesive which has previously been applied.

In order to attain these or other objects appearing from the present specification, claims and drawings, the method of operating the motor means of an adhesive binding machine comprises the following steps:
  detecting by means of a sensor the thickness of a set of pages after input into the machine, while the set of pages is being held between the jaws of the carriage, and
  controlling the motor means in order to modify its speed in a manner inversely proportional to the thickness of the set of pages being detected.

The device for the operation of an adhesive binding in accordance with the invention may comprise the following parts:
  a sensor for detecting the thickness of the set of pages placed in the machine and held gripped between the jaws of the carriage and adapted to provide a signal representative of the thickness of the gripped set of pages, and
  a regulating unit for the speed of the motor means, said unit being arranged to respond to an output signal of said sensor.

Various other features of the invention will be gathered from the description below in conjunction with the attached drawings which show some possible forms of the invention for example only and not for purposes of limitation.

LIST OF THE SEVERAL VIEWS OF THE DRAWINGS.

FIG. 2 is a partial perspective view diagrammatically illustrating the use of the operating device in accordance with the invention.

DETAILED ACCOUNT OF WORKING EXAMPLES OF THE INVENTION.

Figure 1:
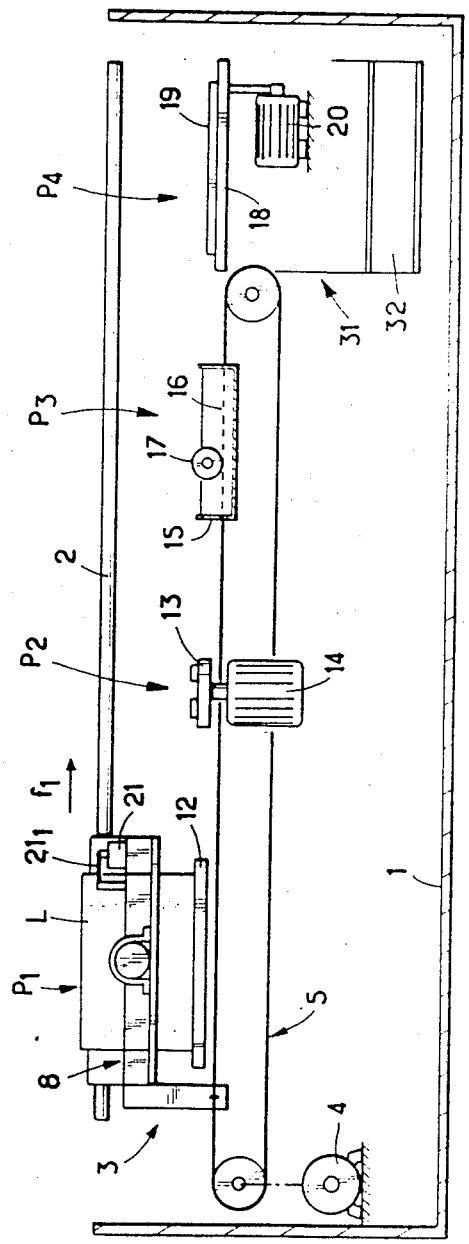
FIG. 1 is a diagrammatic section and elevation of an adhesive binding machine.

As will be seen from the diagrammatic FIGS. 1 and 2 an adhesive binding machine for sets of pages comprises in a conventional manner a frame 1 defining a guide path 2 for a carriage capable of being reciprocated along the path 2 by a motor means or motor 4 and a transmission 5.

The carriage has a loading opening 7 provided with a gripper 8 extending in parallelism to the guide path 2. In a conventional manner the gripper 8 comprises a fixed jaw 9 and a moving jaw 10 able to be moved away from the first jaw to be at desired distances from it by means of a motor means 11 which is supplied with current, in order to cause the opening and closing of the jaw 10, in accordance with the cycle of operation of the machine.

The guide path 2, which is generally linear, is arranged in parallelism with different operating stations in alignment with each other in front of which or in relation to which the carriage 3 is to be displaced. The first operating station is a station $P_1$ in the form of a preparing tray 12 carried by the frame 1 in order to extend in a plane lower than the gripper and in perpendicular alignment with the loading opening 7.

The loading station $P_1$ is followed by a routing station $P_2$ comprising, in horizontal alignment with the preparing tray 12, a cutting member 13 able to be caused to rotate about a vertical axis by a motor 14. The cutting member 13 is constituted, in an inherently conventional manner, by at least one routing or milling cutter with teeth having such a profile that they are able to trim and groove the back surface of a set of pages to be bound using adhesive.

The routing station $P_2$ is followed by a gluing station $P_3$ aligned with the stations $P_1$ and $P_2$. The gluing station $P_3$ is, preferably, adapted to apply thermofusing adhesive and comprises a trough 15 containing a stock of hotmelt adhesive kept at a temperature sufficient to fuse it by a thermostatically controlled heating system, not shown. In an inherently conventional manner, the trough is associated with an adhesive applying cylinder 17 which is caused to rotate by a motor and permanently dips into the adhesive stock 16.

The gluing station $P_3$ is followed by an encasing station $P_4$ comprising a withdrawable table 18, normally aligned with the other stations and arranged to receive a flattened cover, not illustrated, before the same is attached to a set of pages. The withdrawable table 18 is associated with two gripping blades 19 operated by a second motor means 20 so as to be moved towards and away from each other in step with the cycle of operation of the machine.

In accordance with the invention the above-described machine comprises an operating or controlling device in the form of a sensor 21 to detect or respond to the thickness of a set of pages gripped by the gripper 8 of the carriage, and of a regulating unit 22 for modifying the speed of the motor 4.

Preferably the sensor 21 is constituted by a potentiometer adapted to cooperate with the carriage in such a way that the sliding contact $21_1$ of the potentiometer is connected with the moving jaw 10 of the gripper. The sensor 21 is thus arranged to directly supply a signal indicating the thickness of the set of pages gripped between the jaws 9 and 10.

Figure 3:
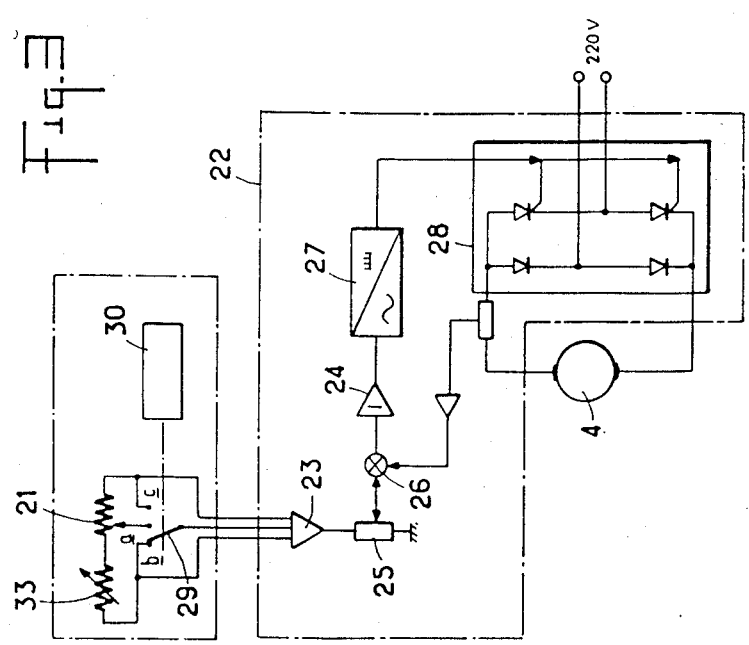
FIG. 3 is a block schematic showing the operating device in accordance with the invention.

As will be seen in more detail from FIG. 3, the unit 22 responds to the signal from the potentiometer 21 in such a manner as to regulate the speed of the motor 4. In accordance with a preferred form of the invention, the regulating unit 22 acts to control the supply voltage to the motor 4, which is in the form of a DC motor.

In this example of the invention the unit 22 comprises a speed regulator 23 adapted to respond to the signal from the sensor 21. The output of the speed regulator 23 is connected with an amperage regulator 24 through a current limiting circuit 25 associated with an adder 26 which receives a current representative of the current flowing in the electric circuit of the motor 4. The amperage regulator 24 is connected, by way of a circuit 27, with a thyristor rectifier 28 supplying the motor 4. The circuit 27 is arranged to control the triggers of the thyristors 28 in such a manner that the rectifier 28 supply a variable supply voltage at a level under the control of the potentiometer controlling the phase relationship of the triggers of the thyristors.

Preferably the potentiometer 21 is connected with the regulating circuit 22 by a switch 29 with three positions a, b and c, under the control of a selecting circuit 30. The switch 29 makes it possible to transmit a signal from the sliding contact (position a), or from one of the end terminals of the potentiometer (positions b or c).

The following is an account of the cycle of operation of the machine described above.

Initially the carriage 3 is in its standby position adjacent to the loading station $P_1$. In this position the gripper 8 is placed over the preparing tray 12 and the moving jaw 10 is in its position of maximum opening.

A set of documents or pages, such as indicated by reference letter L, is then placed between the open jaws 9 and 10 in order to have its back face resting on the preparing tray 12, which makes it possible for the pages to be aligned vertically.

The putting into operation of the machine causes gripping of the set L to take place by the displacement of the moving jaw 10, which in turn causes the sliding contact $21_1$ of the potentiometer 21 to be moved. In the position gripping the set of pages the potentiometer 21 generates a signal representative of the thickness of the gripped set. The selecting circuit 30 then sets the switch 29 in the position a so that the signal from the potentiometer takes effect on the regulating unit 22.

The unit 22 is thus able to cause regulation of the speed of rotation of the electric motor 4 in such a manner as to displace the carriage 3 at a higher speed when the set of pages to be bound has a thickness less than the maximum thickness able to be coped with by the selected motor. The unit 22 makes it possible to adapt the speed of the motor 4 and, in consequence, the speed of the carriage 3 inversely with the detected thickness of the set of pages, such speed being between the lowest speed permissible for the maximum thickness of the set of pages and the highest speed for the minimum thickness of the set of pages.

Then the motor 4 is so supplied as to move, at the selected speed, the carriage in the direction of the arrow $f_1$ and to continuously move it in translation to be opposite the station $P_2$. The routing cutter 13, caused to rotate by the motor 14, trims the back face of the set L in order to even it out and at the same time it cuts grooves in it which are generally transverse in direction, as known in the binding trade.

The supply to the motor 4 is maintained in order to continue to displace the carriage in the direction of the arrow $f_1$ in such a manner that its back face is moved right along the station $P_2$. The carriage 3 then moves the set L of pages in translation to the station $P_3$ where it is frictionally engaged by the gluing cylinder 17, caused to rotate, so that the relative motion of the set of pages in relation to the cylinder causes a film of fused adhesive to be applied to the full area of the back face and fills the grooves cut in the face to join the pages together when such adhesive solidifies.

The carriage 3 is then moved into a position over the station $P_4$ at a reduced speed or in a retarded fashion corresponding to the end of the motion of the carriage. For this reason the switch 29 is moved into its setting b by the selecting circuit 30.

The carriage 3 is halted vertically over the table 18 which will have previously been supplied with a flat cover. The table 18 is raised in order to apply the cover to the back face of the set of pages in order to promote solidification of the film of adhesive between the set L and the cover. After the raising of the table 18, the motor means 20 is supplied with current in order to move the blades 19 together with a view to bending the flat sides of the cover onto the two sides of the back of the set of pages and to complete the join with the set of pages by adhesive.

The jaws 9 and 10 are then opened and, simultaneously, the table 18 is moved out of the way in such a manner that the bound product in the form of the cover and the set L falls under its own weight onto a conveyor 31 placed vertically under the station 4 in order to guide the bound product towards delivery opening 32.

The motor 4 is then operated so that it returns the carriage 3 to the station $P_1$ with a view to receiving a new set of pages to be bound and more especially made into a brochure. In order to increase the hourly production rate of the machine the selecting circuit 30 sets the switch 29 in the position c so that the motor 4 runs at its maximum speed of rotation for the return of the carriage 3. The speed of the carriage is reduced towards the end of the return motion by setting the switch 29 in the position b.

It is to be noted that the machine may perform a cycle of operations such that the set of pages is not subjected to routing and grooving so that the pages may be readily detached from the set. In this cycle of operations the carriage 3 is so moved that it runs from the station $P_1$ at its maximum speed over the station $P_2$, where the routing cutter 13 is halted, and then to the station $P_3$. The carriage 3 then finishes its travel by moving as far as the station $P_4$ at its reduced speed. In order to perform such a cycle of operations the selection circuit 30 sets the switch 29 firstly in the position c and then in the position b.

As a further feature it is possible to place in series with the potentiometer 21 a second potentiometer 33 which is able to be set by hand by the operator in such a way as to reduce the speed of the carriage 3, more especially for cutting more substantial grooves in the back face of the set of pages. The potentiometer 33 is arranged in such a manner that the operator is not able to set a higher speed than the speed set by the potentiometer 21.

Figure 4:
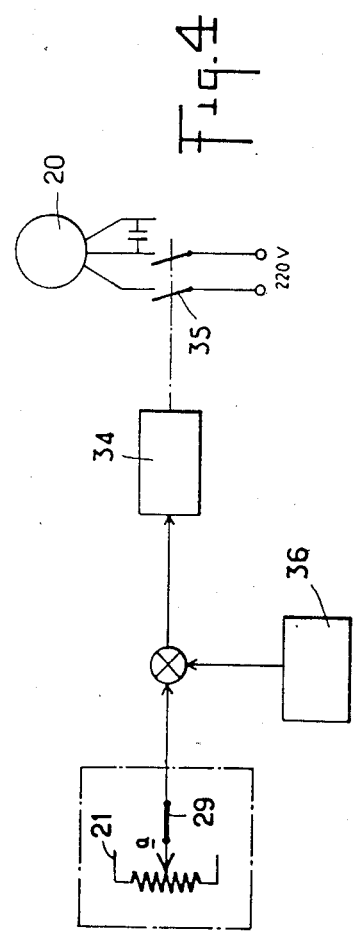
FIG. 4 is a block schematic to show a significant detail of the device in accordance with the invention.

As will appear in more detail from FIGS. 2 and 4, the potentiometer 21 also makes it possible to control the motor 20 in order, taking into account the thickness of the set of pages, to vary the time of pressing the cover against the back part of the set of pages.

For this purpose in the setting a the switch 29 connects the potentiometer with a timer 34 acting by way of a switch 35 on the supply circuit for the electric motor 20. The timer 34 is provided with a controller 36. The control of the gripping time at the encasing station takes into account the quantity of adhesive applied to the back of the set of pages in such a manner as to ensure appropriate hardening of the applied adhesive. This control thus makes it possible to increase the hourly production rate of the machine.

Figure 5:
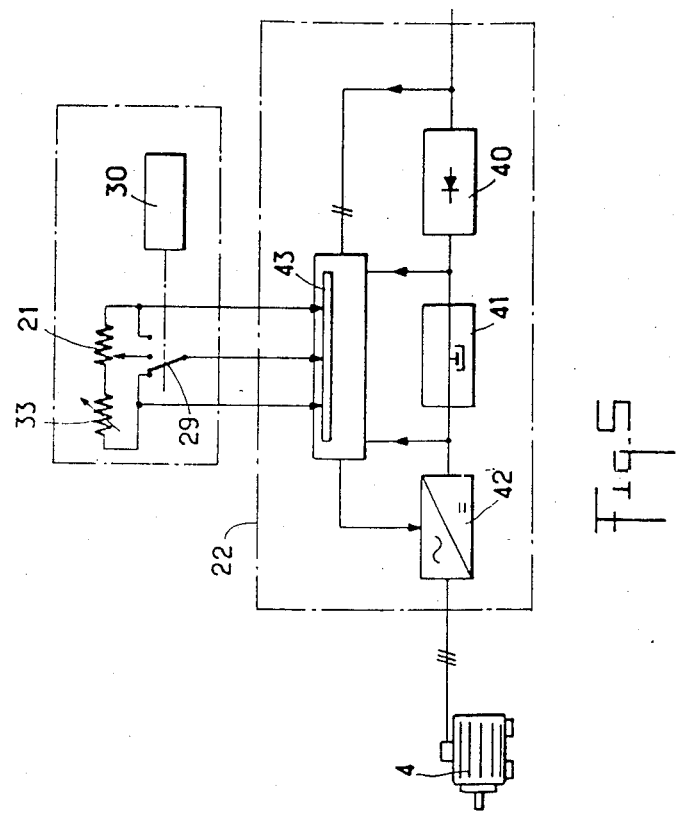
FIG. 5 is a further block schematic showing a possible modification of the device of the invention.

FIG. 5 illustrates another possible form of the regulating unit 22 in which the unit varies the supply frequency of the motor 4, which is in the form of an AC motor.

In this embodiment of the invention the regulating unit 22 comprises a rectifier 40 supplied with single phase current, a filter 41 and an inverter 42 supplying the motor 4 with three phase current. The inverter 42 is controlled by an electronic controller unit 43 receiving command signals from on the one hand the potentiometer 21 via the switch 29 and on the other hand from the single phase supply line and from the outputs of the filter 41 and of the rectifier 40.

The device is not limited to the embodiments described and illustrated herein for various modifications may be made in it without leaving the gist of the invention.

We claim:

1. A method of operating the motor means of an adhesive binding machine for sets of pages, said motor means being adapted to cause reciprocation along a guide path of a carriage comprising a gripper formed by a moving jaw and fixed jaw, in such a manner as to position the carriage successively at a loading station, a routing station, a gluing station and an encasing station, characterized by the following steps:
   a detecting by means of a sensor the thickness of a set of pages after input into the machine, while the set of pages is being held between the jaws of the carriage, and
   controlling the motor means in order to modify its speed in a manner inversely proportional to the thickness of the set of pages being detected.

2. The method as claimed in claim 1 characterized by automatically controlling the power supply to the motor means in response to a signal provided by the sensor.

3. The method as claimed in claim 1 characterized in that a linear potentiometer sensor is used to provide a signal by having a sliding contact thereof connected with said moving jaw.

4. The method as claimed in claim 1 characterized in that the supply of the motor means is controlled in response to a signal from the sensor only during motion of the carriage when moving in a direction away from the loading station towards the encasing station.

5. The method as claimed in claim 1 characterized in that the speed of the motor is so controlled that the motor means is operated at a maximum speed during return motion from the encasing station to the loading station.

6. The method as claimed in claim 1 characterized in that the supply to the motor means is controlled in such a manner that the motor means is run at a reduced speed when approaching either end of the guide path.

7. The method as claimed in claim 1 characterized in that the time of pressing a cover on the set of pages in the encasing station is controlled in a manner in accordance with the detected thickness of the set of pages.

8. A device for operating a binding machine adapted to adhesively bind sets of pages, comprising a carriage having a gripper formed by a moving and a stationary jaw, a motor means adapted to reciprocate the carriage along a guide path extending in a first direction from cooperating relationship with a loading station for charging the carriage with a set of pages, to a routing station for routing a back face of such set of pages, then to a gluing station for the application of adhesive to the said back face and thence to an encasing station for the application of a cover to the set of pages and pressing such cover onto the back of the set for bonding the cover thereto, characterized in that the device comprises:

a sensor to sense the thickness of the set of pages placed on the carriage and held gripped between the jaws thereof, said sensor being arranged to provide a signal representative of the thickness of the set of pages which is so gripped, and a regulating unit for modifying the speed of the motor means in response to an output signal from the sensor.

9. The device as claimed in claim 8 characterized in that the sensor includes a potentiometer with a sliding contact joined to the moving jaw of the carriage.

10. The device as claimed in claim 9 comprising a three way switch and a selection circuit adapted to operate such switch which is connected with terminals of such potentiometer in order to transmit a signal dependent on the position of the sliding contact or one of said terminals to the control unit.

11. The device as claimed in claim 9 characterized by a second manually adjustable potentiometer connected in series with the said potentiometer.

12. The device as claimed in claim 8 characterized in that it comprises a timer responding to a signal from the sensor and intended to set the time of gripping to press such cover onto the set of pages by a second motor means.

13. The device as claimed in claim 8 characterized in that the regulating unit is adapted to modify the voltage of power supplied to the motor means, which is in the form of a DC motor, such unit including a speed of rotation regulator receiving information from the switch, an amperage regulator and a circuit adapted to control the triggers of thyristors of a rectifier for the supply of the motor means.

14. The device as claimed in claim 8 characterized in that the regulating unit is adapted to modify the frequency of electrical power supplied to the motor means, which includes an AC motor, such unit comprising a rectifier, a filter, an inverter to feed the motor means and a controller responding to information from the switch.

15. A binding machine for the adhesive binding of sets of pages including a device for operating said binding machine adapted to adhesively bind sets of pages, said binding machine comprising a carriage having a gripper formed by a moving and a stationary jaw, a motor means adapted to reciprocate the carriage along a guide path extending in a first direction from cooperating relationship with a loading station for charging the carriage with a set of pages, to a routing station for routing a back face of such set of pages, then to a gluing station for the application of adhesive to the said back face and then to an encasing station for the application of a cover to the set of pages and pressing such cover onto the back of the set for bonding the cover thereto, characterized in that the device comprises:

a sensor to sense the thickness of the set of pages placed on the carriage and held gripped between the jaws thereof, said sensor being arranged to provide a signal representative of the thickness of the set of pages which is so gripped, and a regulating unit for modifying the speed of the motor means in response to an output signal from the sensor.

* * * * *